United States Patent
Reuschel et al.

(10) Patent No.: US 6,702,712 B2
(45) Date of Patent: Mar. 9, 2004

(54) METHOD FOR CONTROLLING A CONTINUOUSLY VARIABLE TRANSMISSION

(75) Inventors: Michael Reuschel, Ottersweier (DE); Anton Fritzer, Markdorf (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 10/085,118

(22) Filed: Feb. 28, 2002

(65) Prior Publication Data

US 2002/0132697 A1 Sep. 19, 2002

(30) Foreign Application Priority Data

Feb. 28, 2001 (DE) ............................. 101 09 538

(51) Int. Cl.$^7$ .................... B60K 41/12; F16H 59/00
(52) U.S. Cl. .......................... 477/46; 474/70
(58) Field of Search .................... 474/18, 69, 70, 474/75, 81, 83; 477/44, 45, 46

(56) References Cited

U.S. PATENT DOCUMENTS

| | | | | |
|---|---|---|---|---|
| 4,612,827 A | * | 9/1986 | Omitsu | 477/46 X |
| 4,641,553 A | * | 2/1987 | Kobayashi | 477/47 |
| 4,686,871 A | * | 8/1987 | Kobayashi | 477/39 |
| 5,514,047 A | * | 5/1996 | Tibbles et al. | 477/46 |
| 5,681,238 A | * | 10/1997 | Minowa et al. | 477/102 |
| 6,174,254 B1 | * | 1/2001 | Tsai | 474/69 |
| 6,241,635 B1 | * | 6/2001 | Schmid et al. | 474/70 X |
| 6,277,043 B1 | * | 8/2001 | Friedmann | 474/18 |
| 6,361,456 B1 | * | 3/2002 | Walter | 474/18 |
| 6,431,012 B1 | * | 8/2002 | Agner | 474/18 X |
| 6,435,994 B1 | * | 8/2002 | Friedmann et al. | 474/18 X |

FOREIGN PATENT DOCUMENTS

| | | | | |
|---|---|---|---|---|
| DE | 4039830 | * | 1/1992 | 474/18 |

* cited by examiner

Primary Examiner—Ha Ho
(74) Attorney, Agent, or Firm—Alfred J. Mangels

(57) ABSTRACT

A method for controlling a continuously variable transmission that includes a multi-stage torque sensor. At least one switchover point from one stage to another stage is determined based upon a given input load and is correlated with transmission operating parameters, such as transmission ratio, hydraulic pressure within a chamber in the torque sensor, and transmission output torque.

41 Claims, 2 Drawing Sheets

METHOD FOR CONTROLLING A CONTINUOUSLY VARIABLE TRANSMISSION

BACKGROUND OF THE INVENTION

1. Field of the Invention

The present invention relates to a method for controlling a continuously variable transmission, to an electronic control device with which such a method can be carried out, as well as to a continuously variable transmission.

2. Description of the Related Art

Methods for controlling a continuously variable transmission are known, as are continuously variable transmissions that have a two-stage torque sensor. Such two-stage torque sensors have a mechanical input member and a mechanical output member. The mechanical input member and the mechanical output member each include a ramp system. One or several balls are arranged between the ramp systems so that a torque load imposed upon the input member is transmitted by the balls to the output member.

The output member, that is, piston surfaces, operate on a hydraulic system. The hydraulic system includes a first chamber and a second chamber that are each filled with an hydraulic medium, and that are each loaded by an effective area of the output member. The effective area that operates on the first chamber and the effective area that operates on the second chamber are connected together. Additionally, a connecting conduit that can be opened and closed is also arranged between the first chamber and the second chamber. One of the chambers can also be adjusted to be essentially depressurized or at ambient pressure, wherein the effective area loaded by that chamber does not change the pressure in that chamber independently of a load. The other of those chambers is connected to a third effective area, which influences a disk set of the continuously variable transmission, in particular either directly or through at least one interconnected component.

Depending upon the opening status of the connection passageway between the first and the second chamber a higher or a lower pressure can be produced in the chamber system. Different forces can then act on the disk set as a function of the effective area acting on the disk set and as a function of those different pressures.

The switchover between the stages of the torque sensor is preset in that system at a specific transmission ratio, which is to be provided to the continuously variable transmission upon switchover. Possible changes of the coordination of the transmission ratio with the switchover, for example wear-related changes, or a setting that is incorrect from the beginning, or the like, are not detected by that system.

It should be noted that the indicated state of the art is only an internal state of the art of the applicant and that, in that case, it reserves the right for seeking protection also for those embodiments.

The object of the invention is to produce a differently-configured method for controlling a continuously variable transmission, a differently-configured continuously variable transmission, as well as an electronic control device with which a method for controlling a continuously variable transmission can be carried out.

The object is attained by a method that has at least one of the features that are described in the following description or claims, or that are shown in the drawing figures.

The object is also attained by an electronic control device that has at least one of the features that are described in the following description or claims, or that are shown in the drawing figures, or that can carry out a method in accordance with the invention.

The object is also attained by a continuously variable transmission that has at least one of the features that are described in the following description or claims, or that are shown in the drawing figures.

SUMMARY OF THE INVENTION

In accordance with the invention, there is particularly provided a method for controlling a continuously variable transmission, wherein at least one switchover point or one switchover range of a multiple stage torque sensor is established or adapted. At that switchover point or in that switchover range, the torque sensor is switched over from a first stage of the torque sensor to a second stage of the torque sensor. In those different stages, with a given input load, in particular with a given torque at the input side, in particular on the engine side, the torque sensor produces different loads on the output side, in particular different forces that act on the disk set of a continuously variable transmission. The establishment and/or adaptation is undertaken in particular as a function of at least a first and/or at least a second operating parameter. It is particularly provided that by means of a first and by means of a second operating parameter, the switchover range or the switchover point is described or defined.

BRIEF DESCRIPTION OF THE DRAWINGS

The structure, operation, and advantages of the present invention will become further apparent upon consideration of the following description, taken in conjunction with the accompanying drawing in which.

DESCRIPTION OF THE PREFERRED EMBODIMENTS

Figure 1:
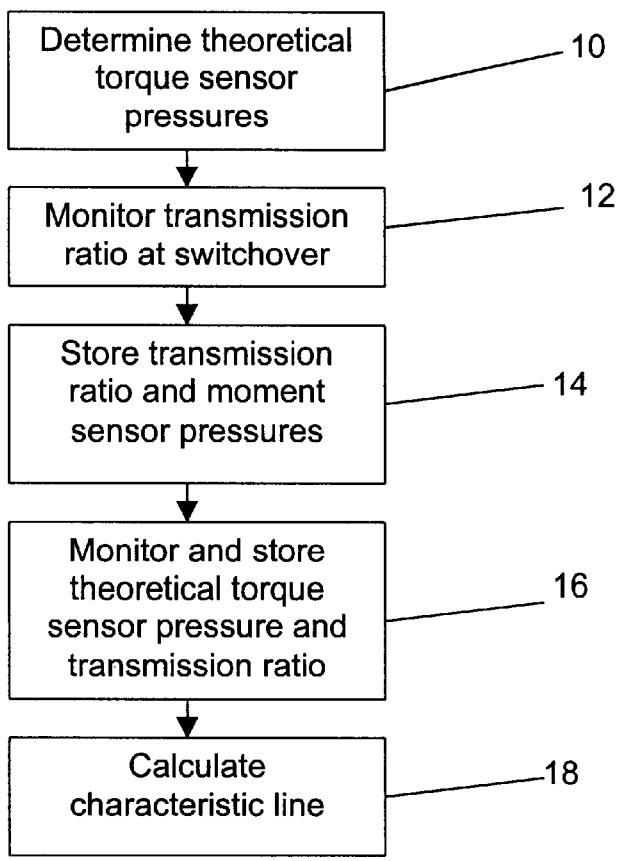
FIG. 1 shows the steps of an exemplary method in accordance with the invention in schematic illustration.

A method in accordance with the present invention is provided particularly for a motor vehicle and can preferably be carried out during operation of the motor vehicle or during the operation of a continuously variable transmission.

In a preferred form, the method in accordance with the invention is carried out automatically.

The first operating parameter is preferably the transmission ratio of a continuously variable transmission. A second operating parameter is preferably the hydraulic pressure that exists within the chamber system or in a predetermined position of the hydraulic chamber system of the torque sensor. A first or a second operating parameter is preferably a torque. That can particularly be a torque that is transmitted by the continuously variable transmission, or a torque that is applied at the input side of the torque sensor.

Preferably, a first chamber is provided that can be filled, and that is filled, with a pressure medium, and which within the scope of this disclosure is also designated as a first pressure chamber. The first pressure chamber is pressurized by a first movably arranged working surface of the torque sensor, whereby the pressure of the pressure medium in the first pressure chamber can be changed or influenced as a function of the position of that working surface, in particular in the axial direction. That first working surface thereby operates on the pressure fluid located in the first pressure chamber, and to be precise, particularly as a type of piston surface of a piston.

Preferably, a second chamber is also provided, which can be filled with a pressure medium, or at least at times is filled with a pressure medium, and which is also identified within the scope of this disclosure as the second pressure chamber. Any pressure medium or pressure fluid, such as hydraulic fluid disposed in the second pressure chamber, can be pressurized by a second movably arranged working surface of the torque sensor, wherein the position, particularly the axial position, of the second working surface is changed, or the second working surface can be loaded with a force. The second working surface particularly forms the boundary of one portion of the second pressure chamber. The first and the second working surfaces are preferably connected with the output part of the torque sensor.

It should be noted that the chamber system can also be or is completely associated with the torque sensor, even when the input side of the chamber system is designated as the output side.

Also, if in a preferred embodiment the first working surface, which can pressurize the pressure medium located in the first pressure chamber, and the second working surface, which can pressurize the pressure medium located in the second pressure chamber, are firmly coupled together, the torque sensor can also be arranged differently.

Preferably, a further portion is provided that has a third working surface of a component that is connected to an axially-movably-arranged disk of a disk set of the continuously variable transmission, so that pressurization of that working surface produces a force, in particular an axial load, on the disk set. The third working surface can also be a surface of a disk of a disk set. The area or the pressure space that has the third working surface, or the chamber that has the third working surface, can be, for example, a third chamber, which is in fluid communication with the first chamber or with the second chamber.

Further, it is preferred that the third working surface partially forms the boundary of the first or second chamber.

According to the invention, it is particularly provided that the second chamber can be depressurized or can be set at ambient pressure. For that purpose, for example, an outlet can be provided, which can be closed if necessary. Preferably, a non-closable outlet is provided in the second chamber.

Preferably, the first chamber is particularly connected with a pump by hydraulic conduits. If necessary, an outlet is also provided in the first chamber. With a closed connection passageway between the first chamber and the second chamber, pressure is preferably built up in the first chamber by the back pressure in the first chamber and/or the torque-dependent load on the first chamber by the first working surface, which pressure acts against the third working surface and thereby applies a force to the disk set. It is therefore particularly provided that the second chamber, which is not connected to the pump when the connection passageway is closed, is essentially depressurized (or at ambient pressure), because when there is a displacement of the second working surface, or a load by means of the second working surface, the pressure in the second chamber can be relieved in the direction of the discharge opening.

When the connection passageway is open, it is particularly provided that the second chamber is in operative connection with the pump through the connection passageway between the first and the second chamber. When the torque sensor is loaded by a moment when in that position, the second working surface acts on the pressure medium in the second chamber and the first working surface influences the pressure medium in the first chamber. The discharge ports can be partially closed or open, so that a back pressure is set in the chambers, which is also determined in particular by the load applied to the torque sensor.

The effective piston surface, which in that position corresponds to the sum of the areas of the first working surface and the second working surface, is effectively increased, in contrast with the case in which the second chamber is essentially depressurized. That has the effect that, in correspondence with the principle $F = p \cdot A$ (where F is the (axial) force acting on the output part of the torque sensor, p is the pressure at a predetermined point in the chamber system, and A is the working surface area to which F is applied), the pressure in the chamber system falls because of the enlarged working surface. In that stage of the torque sensor a lesser pressure acts on the third working surface and therefore a lesser force acts on the disk set of the torque sensor.

The connection passageway between the first and the second pressure chambers is preferably opened or closed as a function of the axial position of an axially movable conical disk of the disk set. In that exemplary arrangement, the pressure in the chamber system is changed or switched between different switching stages, in that case pressure stages, as a function of the transmission ratio of the continuously variable transmission. It should be noted, however, that the switchover of the torque sensor as a function of the transmission ratio can change because of wear or similar influencing operating parameters.

A system of chambers in which the pressure between two loaded chamber systems that in each case are loaded by a one-piece part of the output portion of the torque sensor, or by fluid that is arranged in the first and second chambers, one can designate as a pressure-controlled system, if necessary, by which the load on the disk set varies as a function of the pressure in the chamber system or the switching stages of the torque sensor.

In accordance with the invention, a force-controlled system is certainly also preferred if one follows that concept. That can be realized, for example, in such a way that a fourth working surface, which is connected with the output part of the torque sensor and that acts on a hydraulic fluid arranged in a chamber and thereby pressurizes it.

For example, a fifth working surface can be provided as a boundary of that chamber, or as a further chamber connected to that chamber, and that is connected to a disk of the disk set. Furthermore, a sixth working surface can be provided, which likewise is arranged in a chamber and is connected to the disk set, which is different from the chamber with the fifth working surface. Those two last-mentioned chambers can be connected in a prescribed manner by a closable connection passageway or a switchover system.

The chamber that is partially bounded by the sixth working surface can be uncoupled in the described manner, and can in that way be depressurized or placed at ambient pressure. In doing so, it is therefore particularly provided that the pressure in the chamber system is substantially constant at a given load of the torque sensor, and is in particular independent from other influences, such as the pumping capacity or the like, since the working surface between the output part of the torque sensor and the chamber system is essentially constant.

A load or force variation on the disk set is hereby produced through the working surfaces on the disk set. When the connection passageway between the disk set side chambers is closed, the chamber with the sixth working surface is substantially depressurized, or ambient pressure exists in that chamber, so that substantially no force is exerted on the disk set by that working surface, and a force is only exerted on the disk set by the fifth working surface.

When the connection passageway is opened, the system pressure is in each case transmitted to the chamber with the fifth working surface and the chamber with the sixth working surface, so that in accordance with the mathematical relationship $F=p \cdot A$, the force acting on the disk set is increased in an amount equal to the load acting on the torque sensor.

The invention will be described below in particular on the basis of a system designated as a "pressure-controlled system," which should otherwise not have a limiting effect.

It should be noted that, while the connection passageway is open, a pressure adjustment takes place that produces a switchover range, whereby the pressure applied to the disk set or the force applied to the disk set drops or rises over a certain transmission ratio range until in each case the level of another stage is reached. It should further be noted that, if necessary, throttle effects can occur, which can at least at times cause a different pressure level between the chambers.

The switchover point is, in the sense of the present invention, preferably a correlation from the first operating parameter to the second operating parameter, which are produced at a predetermined point when the torque sensor is switched over. However, by a switchover point, in the sense of the present invention, it is to be understood as a first operating parameter, which is produced when the torque sensor switches between its stages. Insofar as the switchover takes place in a range of first operating parameters, the switchover point can be a point within that range, or a point in that range that is defined according to a predetermined characteristic. The switchover point can preferably also characterize the switchover in other ways.

Preferably, a moment sensor/pressure sensor that can detect the pressure in the pressure medium is arranged in the chamber system, and particularly in the first chamber or in the second chamber or, if necessary, in an existing third chamber. The moment sensor/pressure sensor preferably detects the pressure that acts on the disk set or on the third working surface.

In a preferred embodiment, the measurement range of the moment sensor/pressure sensor is limited to a maximum value. The measurement range of the moment sensor/pressure sensor can, of course, also be unlimited.

In specific cases it is, of course, preferred to provide a moment sensor/pressure sensor with a limited measurement range. That can be the case, for example, when the pressure detected by the moment sensor/pressure sensor is to be utilized for other purposes, for example to control a clutch unit, such as an automated clutch unit, and in doing so a very sensitive pressure reading is needed. Insofar as, for example it is an alternative, possibly because of cost aspects, only moment sensor/pressure sensors are available which, insofar as they can also detect measurement values in a higher measurement range do that with a greater inaccuracy, it can be practical to select the moment sensor/pressure sensor in such a way that it is limited in its upper limit measurement range.

Other instances can also arise, such as cost aspects, which make it practical to use a moment sensor/pressure sensor that is limited in its upper range of values, wherein the actual pressures that occur from time to time within the chamber system are in that case above that maximum value of the moment sensor/pressure sensor.

In a preferred embodiment, the theoretical moment sensor pressure of the first stage and the second stage are determined in each case, particularly calculated, as a function of the moment applied to the torque sensor. Those theoretical moment sensor pressures are particularly calculated as a function of the geometric conditions or the force effects that exist between the moment sensor input and the disk set.

The theoretical moment sensor pressure of the first or the second stage is thus particularly the pressure that is to be applied as a function of the actual moment acting on the input side of the torque sensor as well as the theoretical coupling moment in the first or second stages at a predetermined position within the chamber system, or that is to be applied at a position at which substantially the same pressure is applied that also acts on the third working surface.

Preferably, in particular by means of the moment sensor/pressure sensor, the moment sensor pressure, or the pressure that acts on the third working surface, is monitored.

In a preferred embodiment, whether the actual measured moment sensor pressure is between the theoretical moment sensor pressure of the first stage and the theoretical moment sensor pressure of the second stage is monitored.

In a preferred embodiment, a first parameter is determined or detected, whichever is specified, when it is observed that the actual moment sensor pressure is between the theoretical moment sensor pressure of the first stage and the theoretical moment sensor pressure of the second stage, wherein in that case the actual moment sensor pressure and the first operating parameter are stored. That theoretical moment sensor pressure and that first operating parameter, which is particularly the transmission ratio of the continuously variable transmission, can be used, for example, to define or to describe the switchover range or the switchover point.

It should be noted that instead of the actual moment sensor pressure another, second operating parameter can also be utilized. In particular, the force that is applied to the disk set can be determined by means of a strain gage at a suitable point in the force-controlled and above-described embodiment.

In a preferred embodiment, after determining that the actual measured moment sensor pressure is between the theoretical moment sensor pressure of the first stage and the theoretical moment sensor pressure of the second stage, and before the actual moment sensor pressure reaches the theoretical moment sensor pressure of the first or the second stage, the actual moment sensor pressure is measured at least once, or several times, and in each case the actual applied transmission ratio is determined.

In a preferred embodiment, the moment sensor pressure is monitored when it has been determined that the actual, measured moment sensor pressure is between the moment sensor pressure of the first stage and the moment sensor pressure of the second stage, and when it has been determined that the actual moment sensor pressure has reached one of the theoretical moment sensor pressures of the first or the second stage. As soon as it is determined that the actual moment sensor pressure has reached the theoretical moment sensor pressure of the first stage or the theoretical moment sensor pressure of the second stage, the actual, applied transmission ratio of the continuously variable transmission is determined.

In a preferred embodiment, at least one hysteresis, which results from the back-and-forth switching of the moment sensor, is adapted and determined, in particular especially during the back-and-forth switching between the first stage and the second stage of the moment sensor.

Preferably, at least one separation point of the first stage and/or at least one separation point of the second stage is determined and/or adapted. A separation point is in particular a correlation of a theoretical moment sensor pressure of the respective stage with a first operating parameter, which is essentially provided immediately before a change of the actual pressure in the direction of the theoretical moment sensor pressure of the other stage. It should, of course, be noted, however, that a separation point can also mean such a coordination that is in the close vicinity of the previously-described separation point or the previously-described coordination that is particularly immediately after the actual pressure begins to change in the direction of the theoretical moment sensor pressure of the other stage. Also, the first operating parameter (isolated) of those value pairs can be a separation point.

In a preferred embodiment, in each case two separation points of the first and the second stages of the moment sensor are determined and/or adapted, wherein those separation points can also be correlations of the actual moment sensor pressure with the transmission ratios specified in each case in the range of the first stage or the second stage.

Preferably, a characteristic line, is determined based on at least one of the correlations or based on several correlations between an actually transmitted moment sensor pressure and the simultaneously transmitted transmission ratio of the continuously variable transmission, which line describes the switchover of the moment sensor as a function of those operating parameters. That dependency is, in that case, also described as a function of the theoretical moment sensor pressures.

There are different possibilities for the concrete embodiment of such a characteristic line. For example, a first mean value can be formed from the separation points of the first stage, and a second mean value from the separation points of the second stage. With reference to the respective stages, the mean value is in each case particularly the coordinate pair that results from the half sum of the respective actual moment sensor pressures on the one hand, and the half sum of the transmission ratios associated respectively with those actual moment sensor pressures, on the other hand. However, other embodiments, for example in accordance with weighted mathematical functions, or the like, are also preferred.

In a preferred embodiment, a characteristic line is described or determined by means of those mean values. That characteristic line can be formed as connected straight lines or in other ways.

In the determination or calculation of such a characteristic line other parameters or operating parameters, such as, for example, geometric parameters of the torque sensor, can also be included. For example, in particular the actual opening cross section of the connection passageway between the first chamber and the second chamber or other parameters can be entered.

In a preferred embodiment, the mean value is determined from the theoretical moment sensor pressure of the first and the second stages. Furthermore, the actual moment sensor pressure is monitored. When the actual moment sensor pressure corresponds with the mean value of the theoretical moment sensor pressures, the actually transmitted transmission ratio of the continuously variable transmission is determined. On the basis of that last-mentioned value pair coordination a characteristic line is determined or the switchover is described.

In a preferred embodiment, the method in accordance with the invention is carried out at a constant torque, that is, particularly a constant torque that applies a load to the torque sensor.

Also certainly preferred, is that the method in accordance with the invention is carried out in each case for different, preferably constant torques. In that way the load dependence of the switchover point or range can be particularly determined or taken into consideration in the characteristic line determination.

In a preferred embodiment, a moment sensor can be provided that has more than two stages. Also in a moment sensor of that type, a preferred embodiment of the method according to the invention is utilized to describe the switchover processes.

In a preferred embodiment, the method in accordance with the invention is utilized to determine a switchover characteristic line of the torque sensor or the switchover point of the torque sensor, to utilize that result for a preliminary control of the transmission ratio control of the continuously variable transmission, that is, particularly for the determination of a standard-dependent portion of the preliminary control process. The standard is therein the relationship of the forces that load the first disk set of the continuously variable transmission on the one hand, and the second disk set of the continuously variable transmission on the other hand, that is, particularly at a constant transmission ratio.

The respective transmission ratios that are coordinated with the respective actually measured pressures can be determined in different ways. For example, those transmission ratios are determined based on the rotational speeds that are transmitted to the input side and to the output side of the continuously variable transmission in the power train. If necessary, further, known transmission ratio steps, such as, for example, the transmission ratio of the differential, or the like, can also be transmitted between those rotational speeds or with the corresponding rotational speeds of rotating parts. At that point corresponding calculations or recalculations can be carried out. In a preferred embodiment, the transmission ratio is determined based on the engine rotational speed on the one hand, and the wheel rotational speed of the motor vehicle on the other hand.

However, other embodiments are also preferred in accordance with the invention.

The switchover point or range is preferably substantially specified at a transmission ratio of 1:1 of the continuously variable transmission, but other embodiments are also preferred.

The invention is further implemented by an electronic control device. The electronic control device at least partially controls in particular the method in accordance with the invention, or evaluates detected operating parameters in accordance with the method of the invention. The electronic control device can, for example, have a memory unit in which the detected pressures and the correlated transmission ratios are stored. Further, mathematical relationships, or the like, which are utilized for the determination of the characteristic lines describing the switchover processes, can also be stored in the electronic control device.

The invention is further implemented with a continuously variable transmission. A continuously variable transmission preferably includes two disk sets, between which torque can be transmitted by an endless, torque-transmitting means. The endless, torque-transmitting means is especially preferred to be a chain, such as a plate-link chain.

The disk pairs each preferably have two disks that are movable relative to each other in the axial direction. The respective disks of those disk pairs are preferably designed as conical disks arranged with their tapered sides facing each other. In a particularly preferred embodiment, a respective one of those disks of the disk pairs is connected with a shaft in a non-rotational and axially fixed manner, especially as an integrally-formed component, while a respective second one of those conical disks of the same conical disk pair is preferably non-rotatably arranged on the shaft in an axially movable manner.

The distance between the axes of the disk pairs is preferably constant. Preferably, means are provided that can apply a load on disk sets or on at least one of the disk sets, particularly in the axial direction. Those means preferably have means for holding a set transmission ratio of the continuously variable transmission, as well as means for adjusting the transmission ratio of the continuously variable transmission. There results the loading of one disk set as a function of or independently of the loading of the other disk set. It is particularly provided that the movably arranged disk can apply a load on one or each one of the disk sets in an axial direction.

It is particularly preferred to provide that the means for holding a set transmission ratio and the means for adjusting the transmission ratio cooperate, namely especially in such a way that to hold a transmission ratio essentially only the means for holding the transmission ratio apply load on the respective disk sets, and that to adjust the transmission a load is superimposed on the previously-mentioned load on at least one of the disk sets, which is applied by the means for adjusting the transmission ratio. Those loads act particularly in the axial direction.

To hold a transmission ratio, a load is preferably applied to the respective disk sets in the axial direction, which particularly preferably is dependent upon or is correspondingly controlled by the torque transmitted between the disk sets and/or by the adjusted transmission ratio. That load can be produced mechanically and/or hydraulically, or in other ways. The load causes sufficient frictional forces to be produced between the endless, torque-transmitting means and the respective disk set to transmit the respective torques to be transmitted between the disk sets.

The means for holding the transmission ratio preferably has a torque sensor that produces a force on the output side as a function of an input side torque and, if necessary, as a function of the transmission ratio set in the continuously variable transmission, and as a function of which the respective disk set is loaded.

By the application of such a torque sensor, which can be based in particular upon a hydraulic principle, a separate torque sensor can be provided for each disk set, or one can be associated with both of the disk sets, or a torque sensor that applies the load to only one of those disk sets, wherein load is applied to the other disk set in other ways, such as, for example, by means of a lead screw.

The torque sensor is particularly preferably configured in accordance with one of the embodiments described in U.S. Pat. No. 5,711,730, entitled "Torque Monitoring Apparatus," which issued on Jan. 27, 1998, to Oswald Friedmann et al., the entire disclosure of which is hereby incorporated by reference herein to the same extent as if fully rewritten.

The means for adjusting the transmission ratio can be based on a hydraulic and/or a mechanical or on another principle.

The axial load on the conical disks, in particular for holding a transmission ratio, is preferably introduced in such a way that, in particular as a function of the inclination of the conical surfaces of the conical disks, the endless, torque-transmitting means is loaded by a force by the respective disk set to effect or to enable frictionally-engaged torque transmission through the continuously variable transmission or the endless, torque-transmitting means, that is, particularly with a given transmission ratio of the continuously variable transmission. The pressing force required to transmit the corresponding torque preferably has a part that is a function of the set transmission ratio of the continuously variable transmission, as well as a part that is a function of the moment. It is particularly preferred that the pressing force that acts on the respective conical disk set is set as a function of the corresponding required pressing force, or as a function of at least a part of that pressing force.

It is particularly preferred that the forces acting in the axial direction on the respective disks of a disk set are controlled as a function of the torque to be transmitted, that is, particularly with reference to each individual disk set. It is particularly provided that, in that way, different forces can act on different disk sets in the axial direction.

A plate-link chain preferably has several chain links that are connected to each other by link elements. The link elements preferably have pairs of rocker members that have roller surfaces that can roll on or roll against each other. It is especially preferred that the respective chain links each have several plate links, which, within a chain link and/or with reference to different chain links, are equally or differently configured. The plate-link outer contour and/or the plate-link inner contour of the plate links is configured equally or differently. Different chain links have an identical or a different spacing.

Preferably, in each case at least one rocker member of a rocker member pair extends laterally outwardly from the plate-link sets and can be supported on the disks of a respective disk set in a frictionally engaged manner for transmitting torque. During torque transmission, frictional forces preferably act between the end faces of the rocker members and the surfaces of the respective disks. If necessary, the rocker members can be rounded off or inclined at their ends, or they can be configured in other ways.

If necessary, retaining devices, such as welding points, or retaining links, or the like are provided, which prevent lateral sliding of the plate links relative to the rocker members. It is further preferred that a deviation retainer be provided, which confines the deviation angle between adjacent chain links, and especially preferably prevents excessive oscillations of the plate links during the operation of the plate-link chain.

To adjust the transmission ratio, it is preferably provided that the disks of one disk pair move in an axial direction toward each other, while substantially simultaneously the axial spacing between the disks of the other disk pair is increased, so that an endless, torque-transmitting means having a constant length is in contact with the respective disk pairs during the adjustment process.

The term "controlling" should be particularly understood in the sense of the present invention as "regulating" and/or "controlling" in the sense of the DIN (German Industrial Standards). The same applies for the terms derived from "controlling."

Referring now to the drawings, FIG. 1 shows the steps of an exemplary method in accordance with the invention in which in step 10 the theoretical moment sensor pressure of the first stage of the moment sensor as well as of the second stage of the moment sensor are determined or calculated.

As long as the actual moment sensor pressure is in the range between the maximum value that can be registered by the pressure sensor of the moment sensor and the back pressure, in step 12 the transmission ratio at which the pressure from one of the stages deviates or changes in the direction of the pressure of the other stage is monitored in the vicinity of the switchover point. That value or that pair of values is stored in step 14.

In step 16, when the moment sensor pressure reaches the theoretical moment sensor pressure of the other stage, or corresponds with it, is monitored, and the associated transmission ratio is also determined and the pair of values is stored.

In step 18 on the basis of those determined pairs of values a characteristic line that describes the switchover of the moment sensor is calculated.

Figure 2:
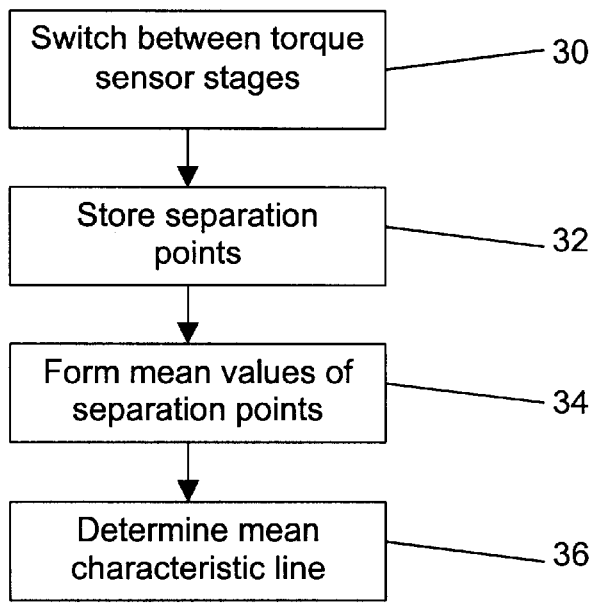
FIG. 2 shows the steps of an exemplary method in accordance with the invention in schematic illustration.

FIG. 2 shows the steps of another exemplary embodiment of a method in accordance with the invention. In step 30 a back-and-forth switching of the moment sensor from one stage into the other stage of the moment sensor and back is started. That back-and-forth switching, or that hysteresis, is carried out in step 32, whereby the separation points of the respective stages are stored.

In step 34 the respective mean values of the separation points for the two stages are formed. In step 36, a mean characteristic line that describes the switchover of the torque sensor, is determined on the basis of those mean values.

Figure 3:
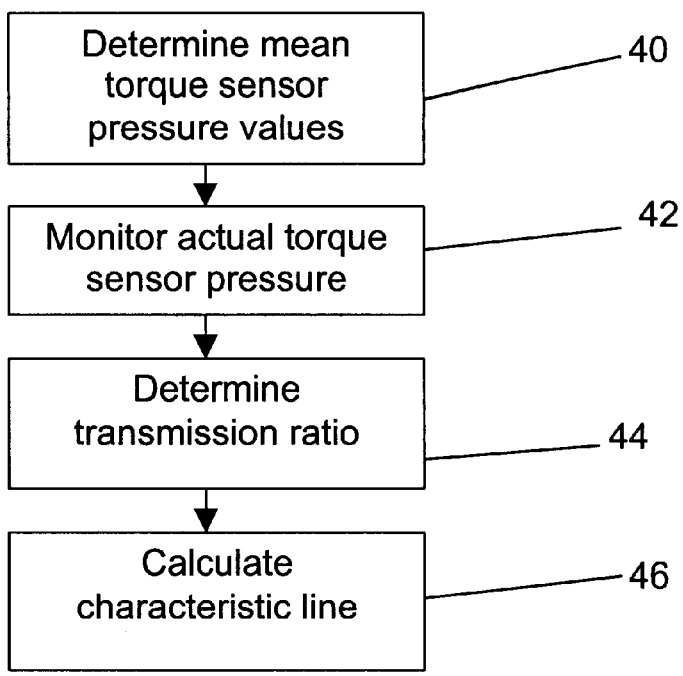
FIG. 3 shows the steps of an exemplary method in accordance with the invention in schematic illustration.

FIG. 3 shows the steps of another exemplary embodiment of a method in accordance with the invention. In step 40, the mean moment sensor pressure value is derived from the theoretical moment sensor pressure of the first and the second stages. In step 42 whether the actual moment sensor pressure intersects or reaches that value is monitored. Always when that is the case the currently corresponding transmission ratio of the continuously variable transmission is determined in step 44. In step 46, a characteristic line is calculated on the basis of that transmission ratio and an assumed width.

Figure 4:
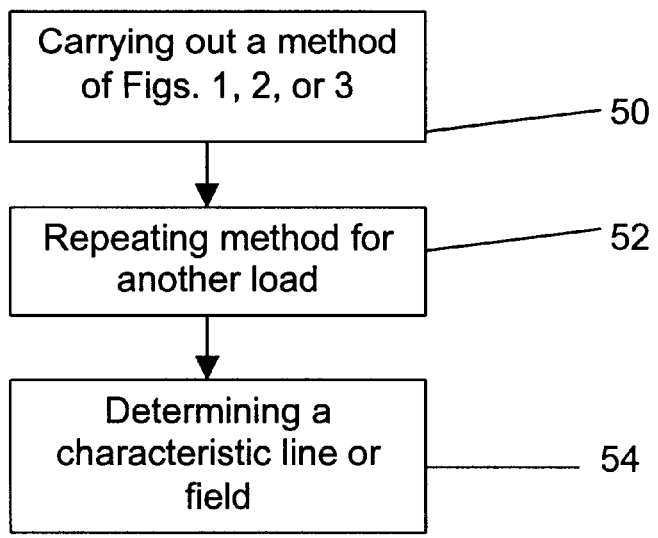
FIG. 4 shows the steps of an exemplary method in accordance with the invention in schematic illustration.

FIG. 4 shows the steps of another exemplary method in accordance with the invention. In step 50, one of the methods in accordance with FIGS. 1 to 3 is carried out for a predetermined load that is applied to the moment sensor. In step 52, that method or another one of the methods shown in FIGS. 1 to 3 is repeated at least once for another load. The number of different loads for which that method is carried out or the different torques that are applied to the moment sensor, can basically be arbitrarily selected.

In step 54 a characteristic line or a characteristic field is determined that takes into consideration the load dependency of the switchover point or the switchover range of the moment sensor.

The claims included in the application are illustrative and are without prejudice to acquiring wider patent protection. The applicant reserves the right to claim additional combinations of features disclosed in the specification and/or drawings.

The references contained in the dependent claims point to further developments of the object of the main claim by means of the features of the particular claim; they are not to be construed as renunciation to independent, objective protection for the combinations of features of the related dependent claims.

Although the subject matter of the dependent claims can constitute separate and independent inventions in the light of the state of the art on the priority date, the applicants reserve the right to make them the subject of independent claims or separate statements. They can, moreover, also embody independent inventions that can be produced from the independent developments of the subject matter of the included dependent claims.

The exemplary embodiments are not to be considered to be limitations of the invention. On the contrary, many changes and variations are possible within the scope of the invention in the existing disclosure, in particular such variants, elements, and combinations and/or materials which, for example, are inventive by combining or modifying single features that are in combination and are described individually in relation to the general specification and embodiments as well as the claims and shown in the drawings, as well as elements or method steps that can be derived by a person skilled in the art in the light of the disclosed solutions of the problem, and which by means of combined features lead to a new object or new method steps or sequences of method steps, as well as manufacturing, testing and operational procedures.

What is claimed is:

1. A method for controlling a continuously variable transmission, said method comprising the steps of:

providing a multiple stage torque sensor that is operatively associated with the transmission; determining at least one switchover point of the torque sensor at which the torque sensor is switched from a first operating stage to a second operating stage as a function of at least a first transmission operating parameter; and causing the torque sensor to apply an axial load to a disk of a disk set in the continuously variable transmission as a function of a load applied to an input side of the torque sensor, wherein the load imparted by the torque sensor on the disk is a function of the switched stage of the torque sensor at a predetermined input load applied to the torque sensor.

2. A method in accordance with claim 1, wherein the transmission operating parameter is the transmission ratio of the continuously variable transmission.

3. A method in accordance with claim 1, wherein the transmission operating parameter is a torque.

4. A method in accordance with claim 1 wherein the transmission operating parameter is a transmission output torque transmitted by the continuously variable transmission.

5. A method in accordance with claim 1, wherein the transmission operating parameter is a torque that is applied at the input side of the torque sensor.

6. A method in accordance with claim 1, including the step of applying a load to the continuously variable transmission by an internal combustion engine, wherein a torque applied at the input side of the torque sensor is a function of torque provided by the internal combustion engine.

7. A method in accordance with claim 1, including the step of determining hysteresis by the back-and-forth switching of the torque sensor between stages.

8. A method in accordance with claim 1, including the step of providing an electronic control device for carrying out the method.

9. A method for controlling a continuously variable transmission, said method comprising the steps of: providing a multiple stage torque sensor that is operatively associated with the transmission; determining at least one switchover point of the torque sensor at which the torque sensor is switched from a first operating stage to a second operating stage as a function of at least a first transmission operating parameter; and providing a first chamber in the torque sensor that is filled with a pressure medium and that has a first movably arranged working surface to influence the pressure of a pressure medium based upon a position of the first surface within the first chamber.

10. A method in accordance with claim 9, including the step of transmitting the pressure of the pressure medium in the first chamber to a third working surface of a torque sensor component that is connected with an axially movably arranged disk of a disk set of the transmission to effect an axial load on the movable disk.

11. A method in accordance with claim 9, including the steps of: providing a second chamber that can be filled with a pressure medium and that includes a second movably arranged working surface; and influencing the pressure of the pressure medium within the first chamber by the position of the second surface.

12. A method in accordance with claim 11, wherein the first working surface of the torque sensor is fixedly connected to the second working surface of the torque sensor.

13. A method in accordance with claim 11, wherein a closable connection passageway is provided between the first chamber and the second chamber.

14. A method in accordance with claim 13, including the step of controlling opening of the connection passageway as a function of an axial position of a movably arranged disk of a disk set of the continuously variable transmission.

15. A method in accordance with claim 11, including the step of providing a pump for feeding pressure medium into at least one of the chambers.

16. A method in accordance with claim 11, including the step of providing an outlet conduit through which the pressure medium can escape from at least one of the chambers.

17. A method in accordance with claim 13, wherein the second chamber is substantially depressurized when the connection passageway is in a closed condition.

18. A method in accordance with claim 13, wherein a first stage of the torque sensor is defined when the connection passageway between the first chamber and the second chamber is closed.

19. A method in accordance with claim 18, wherein a second stage of the torque sensor is defined when the connection passageway between the first chamber and the second chamber is opened.

20. A method in accordance with claim 19, wherein in the second stage of the torque sensor, the pressure of the pressure medium in the second chamber corresponds substantially with the pressure of the pressure medium in the first chamber.

21. A method in accordance with claim 9, wherein the pressure of the pressure medium that is applied to a third working surface in the first stage of the torque sensor is greater than the pressure of the pressure medium that is applied to the third working surface in the second stage of the torque sensor.

22. A method in accordance with claim 19, wherein a switchover point of the torque sensor is defined when the connection passageway switches between open and closed.

23. A method in accordance with claim 10, including the steps of: of providing a moment sensor/pressure sensor for detecting under preset conditions the pressure of a pressure medium; and detecting a pressure applied by the pressure medium to the third working surface when the detected pressure is less than a predetermined maximum pressure value.

24. A method in accordance with claim 23, wherein the pressure detected by the moment sensor/pressure sensor is limited to a maximum value, and wherein pressure medium pressures are under certain conditions greater than the maximum value.

25. A method in accordance with claim 10, including the step of determining under predetermined conditions a theoretical torque sensor pressure of the first stage as a function of torque applied at an input side of the torque sensor, wherein the theoretical torque sensor pressure of the first stage is a pressure of the pressure medium applying load to the third working surface when the first stage of the torque sensor is switched.

26. A method in accordance with claim 10, including the step of determining under predetermined conditions a theoretical torque sensor pressure of the second stage as a function of torque applied at an input side of the torque sensor, wherein the theoretical torque sensor pressure of the second stage is a pressure of the pressure medium applying load to the third working surface when the second stage of the torque sensor is switched.

27. A method for controlling a continuously variable transmission, said method comprising the steps of: providing a multiple stage torque sensor that is operatively associated with the transmission; determining at least one switchover point of the torque sensor at which the torque sensor is switched from a first operating stage to a second operating stage as a function of at least a first transmission operating parameter; providing a torque sensor/pressure sensor; and monitoring an actual torque sensor pressure with the torque sensor/pressure sensor.

28. A method in accordance with claim 27, wherein monitoring occurs as to whether an actual torque sensor pressure is between a theoretical torque sensor pressure of the first stage and a theoretical torque sensor pressure of the second stage.

29. A method in accordance with claim 28, including the steps of: determining a first operating parameter when it is determined that actual torque sensor pressure is between the theoretical torque sensor pressure of the first stage and the theoretical torque sensor pressure of the second stage; and storing the actual torque sensor pressure and the first operating parameter.

30. A method in accordance with claim 29, including the step of repeating the determination of the actual torque sensor pressure and a corresponding first operating parameter before the actual torque sensor pressure corresponds with the theoretical torque sensor pressure of one of the first stage and the second stage.

31. A method in accordance with claim 27, including the steps of: monitoring when the actual torque sensor pressure corresponds with a theoretical torque sensor pressure of the first stage or and a theoretical torque sensor pressure of the second stage, when it has been determined that the actual torque sensor pressure is between the theoretical torque sensor pressure of the first stage and the theoretical torque sensor pressure of the second stage; determining a first operating parameter that results when the actual torque sensor pressure reaches a theoretical torque sensor pressure; and storing theoretical torque sensor pressures and corresponding first operating parameters.

32. A method for controlling a continuously variable transmission, said method comprising the steps of: providing a multiple stage torque sensor that is operatively associated with the transmission; determining at least one switchover point of the torque sensor at which the torque sensor is switched from a first operating stage to a second operating stage as a function of at least a first transmission operating parameter; determining under predetermined conditions a torque applied at an input side of the torque sensor; and determining a theoretical torque sensor pressure of the first stage as well as a theoretical torque sensor pressure of the second stage a function of said torque.

33. A method for controlling a continuously variable transmission, said method comprising the steps of: providing a multiple stage torque sensor that is operatively associated with the transmission; determining at least one switchover point of the torque sensor at which the torque sensor is switched from a first operating stage to a second operating stage as a function of at least a first transmission operating parameter; and carrying out the method at one of a substantially constant torque that is applied continuously on an input side of the torque sensor and a substantially constant torque transmitted by the continuously variable transmission.

34. A method for controlling a continuously variable transmission, said method comprising the steps of: providing a multiple stage torque sensor that is operatively associated with the transmission; determining at least one switchover point of the torque sensor at which the torque sensor is switched from a first operating stage to a second operating stage as a function of at least a first transmission operating parameter; and determining two separation points of the first and the second stages of the torque sensor by a back-and-forth switching between the first stage and the second stage.

35. A method in accordance with claim 34, including the steps of: establishing a mean value of separation points of the first stage that have been determined by a back-and-forth switching of the torque sensor; establishing a mean value of separation points of the second stage that have been determined by a back-and-forth switching of the torque sensor, wherein the respective mean values are a correlation of the half sum of the respective pressures of the respective separation points to the half sum of the respective first operating parameter corresponding with those pressures.

36. A method in accordance with claim 35, including the step of determining a characteristic line that describes a switching over of the torque sensor between the first and second stages as a function of mean values of separation points of a stage of the torque sensor.

37. A method for controlling a continuously variable transmission, said method comprising the steps of: providing a multiple stage torque sensor that is operatively associated with the transmission; determining at least one switchover point of the torque sensor at which the torque sensor is switched from a first operating stage to a second operating stage as a function of at least a first transmission operating parameter; and determining at least one separation point of at least one of the first stage and the second stage, wherein a separation point is a correlation of a theoretical torque sensor pressure of the corresponding stage with a first operating parameter that results from a change of actual pressure in one stage in the direction of actual pressure of the other stage.

38. A method in accordance with claim 37, including the steps of: determining the mean value of a theoretical torque sensor pressure of the first stage and a theoretical torque sensor pressure of the second stage; monitoring an hydraulic pressure in the torque sensor; and respective first operating parameters when the actual torque sensor pressure corresponds with a torque sensor pressure mean value.

39. A method in accordance with claim 38, including the stop of determining a characteristic line that describes the switchover of the torque sensor between the first stage and the second stage as a function of the torque sensor pressures and the first operating parameter, wherein a spacing of characteristic lines corresponds with a difference between the first operating characteristics by which an actual torque sensor pressure reaches the theoretical torque sensor pressure of at least one of the first stage and the second stage, and a s function of the correlations of the torque sensor pressure mean value and respectively determined corresponding first operating characteristics and as a function of a spacing between characteristic lines.

40. A method in accordance with claim 38, including the step of determining a characteristic line as a function of at least one coordination of an actual torque sensor pressure with a first operating characteristic coordinated therewith and that describes the switchover of the torque sensor between the first and the second stage of the torque sensor as a function of torque sensor pressures and the first operating characteristic.

41. A method for controlling a continuously variable transmission, said method comprising the steps of: providing a multiple stage torque sensor that is operatively associated with the transmission; determining at least one switchover point of the torque sensor at which the torque sensor is switched from a first operating stage to a second operating stage as a function of at least a first transmission operating parameter; determining a load dependency of the switchover point of the torque sensor; and carrying out the method with a substantially constant first load and at least one substantially constant second load, wherein the second load is different from the first load.

* * * * *